United States Patent [19]

Hallock et al.

[11] Patent Number: 5,125,779
[45] Date of Patent: Jun. 30, 1992

[54] SHEET METAL NAILS WITH COATED HEADS

[75] Inventors: Peter Hallock, Swansea, Mass.; John R. Barker, Pawtucket, R.I.

[73] Assignee: ES Products, New Rochelle, N.Y.

[21] Appl. No.: 701,843

[22] Filed: May 17, 1991

[51] Int. Cl.⁵ .................................... F16B 15/00
[52] U.S. Cl. .................... 411/446; 411/461; 411/477; 411/923
[58] Field of Search ............... 411/439, 461, 487, 914, 411/922, 903, 453, 450, 451, 446, 477, 923, 478, 480, 482, 448

[56] References Cited

U.S. PATENT DOCUMENTS

| | | | |
|---|---|---|---|
| 2,226,006 | 12/1940 | Maze | 411/453 |
| 2,326,455 | 8/1943 | Gray | 411/914 X |
| 2,550,060 | 4/1951 | Gisondi | 411/451 X |
| 2,824,663 | 2/1958 | Fischer | 411/903 X |
| 3,466,967 | 9/1969 | Hallock | 411/477 |
| 3,710,672 | 1/1973 | Hallock | |
| 3,878,756 | 4/1975 | Hallock | |
| 4,206,264 | 6/1980 | Kurr | 411/439 X |
| 4,213,373 | 7/1980 | Hallock | |
| 4,627,207 | 12/1986 | Young et al. | |
| 4,641,471 | 2/1987 | Young et al. | |
| 4,641,472 | 2/1987 | Young et al. | 411/477 X |
| 4,813,833 | 3/1989 | Haab | 411/903 X |
| 4,964,774 | 10/1990 | Lat et al. | 411/446 |

FOREIGN PATENT DOCUMENTS

| | | | |
|---|---|---|---|
| 601536 | 3/1926 | France | 411/439 |
| 2184187 | 6/1987 | United Kingdom | 411/903 |

*Primary Examiner*—Rodney M. Lindsey
*Attorney, Agent, or Firm*—Dowell & Dowell

[57] ABSTRACT

Sheet metal fasteners and/or washers of the type which are used to fasten membranes to cementitious materials of a type such as utilized in roofing wherein the fasteners are treated to provide a corrosion resistant coating to the washers and those portions of the fasteners not inserted into the cementitious material.

9 Claims, 2 Drawing Sheets

SHEET METAL NAILS WITH COATED HEADS

BACKGROUND OF THE INVENTION

1. Field of the Invention

This invention is generally directed to nails and other types of fasteners and more specifically to sheet metal fasteners of the type which are utilized to secure membranes to cementitious material such as utilized in roofing applications wherein the fasteners are designed to have a shank or shanks having leg portions which when driven through the membrane and into the cementitious material will expand to retain a plug of the cementitious material to thereby prevent the fasteners from being removed from the cementitious material. Even more specifically, the present invention is directed to such fasteners that are designed to be corrosion resistant and wherein the head portion of the fasteners and any washers or discs that may be utilized in conjunction therewith are coated with corrosion resistant materials leaving at least a substantial portion of the shank or legs of the fasteners uncoated so that the fasteners may chemically react with the cementitious material to establish a strong chemical bond therebetween.

2. History of the Related Art

Lightweight cementitious roofing systems have long been utilized in the construction industry. Such systems employ a slurry of Portland cement and water which is impregnated with either a foam or aggregate material. The uncured cementitious material is generally poured over metal decking or concrete decking which forms the reinforcing components of the roofing structure. In some such roofing systems an insulating material is placed atop the roofing substructure and thereafter encapsulated into a poured cementitious material such as a lightweight insulating concrete. Once the roof deck is poured, it is covered by a roofing membrane which is frequently a base ply which is fastened to the cementitious material by the use of fasteners of the type disclosed in U.S. Pat. No. 3,710,627 to Robert L. Hallock. These fasteners include shanks formed of opposing legs which are designed to spread relative to one another so as to enclose a plug of cementitious material therebetween when the fasteners are driven through the base ply and into the cementitious material. Such fasteners are designed to withstand removal by securing a plug of material which is of a size greater than the opening into or through the base ply. In some instances a separate washer or disc is utilized in conjunction with the fasteners. The disc, like the fastener, may be galvanized. The discs are designed to distribute stresses so as to prevent rupturing of the membrane or base ply covering the cementitious material. Examples of such discs are disclosed in U.S. Pat. No. 4,627,207 to Young et al.

After the initial layer of membrane has been secured by mechanical fasteners to the cementitious material, additional plies of roofing membrane may be applied over the fasteners and membrane using conventional sealing agents. Such an assembly is a conventional "built-up roof". Other water proofing membranes may be applied either directly atop the cementitious roof deck or to the fastened base ply.

To ensure the integrity of such cementitious roofing systems and other building products, parameters have been set forth by testing agencies such as Underwriters Laboratories, Inc. and Factory Mutual Research Corporation. One such parameter or guideline established by an independent testing facility to determine a product's resistance to corrosive environments has been referred to as a "Kesternich test". The test is used to determine resistance to corrosion of mechanical fasteners used in roofing systems. The test sets forth specific requirements that such fasteners and the washers or discs utilized in conjunction therewith exhibit a resistance to the formation of corrosion. It has been noted over a period of years that sheet metal fasteners corrode at a rate in excess of that which a testing agency has determined acceptable for the long term integrity of roofing systems.

It has been recognized that galvanized coatings associated with conventional metallic fasteners develop a bond with cementitious roof decking thereby increasing the withdrawal resistance of the fasteners over a period of time. As much as 50% of the long-term withdrawal resistance of the fasteners is attributable to the chemical reaction between the galvanized coating on the fasteners and the cementitious material in a roof deck. Therefore, any attempt to alter the surface or chemical characteristics of fasteners and especially galvanized fasteners would result in a significant reduction of the withdrawal resistance of such fasteners.

An independent testing agency has determined that under certain conditions corrosion may develop along the head portion of such conventional fasteners after installation. To overcome the problems of corrosion it was originally believed that such fasteners could simply be completely coated with a corrosion resistant paint or other material and thereafter applied in a conventional manner to a roof deck system. However, through testing it has become apparent that coating all portions of such fasteners negates the bond that would otherwise develop between the fasteners and the cementitious material. A chemical reaction occurs between the zinc of the galvanized coating of the sheet metal of the fasteners and the cementitious material which results in the formation of a strong bond. As previously discussed, it has been determined that this bond may account for as much as 50% of the long-term withdrawal resistance of the fasteners and is therefore essential to the long-term performance of such fasteners and roof deck systems utilizing such fasteners.

Some additional examples of conventional roof deck fasteners include U.S. Pat. Nos. 3,466,967, 3,878,756 and 4,213,373 to Hallock. Some additional examples of discs or washers utilized with mechanical fastening systems in cementitious roof deck systems are disclosed in U.S. Pat. Nos. 4,641,471 and 4,641,472 to Young et al.

SUMMARY OF THE INVENTION

This invention is directed to sheet metal fasteners of the type which are normally utilized in securing membranes to cementitious roofing systems wherein a corrosion resistant material is applied to the head portion of the fasteners but wherein the shank or leg portions of the fasteners are free of the supplemental corrosion resistant material, leaving the exposed sheet metal free to chemically bond with the cementitious material once the fasteners have been placed into use. In some embodiments, the mechanical fasteners will be utilized with separate discs or enlarged washers which are also protected by a corrosion resistant material. In the preferred embodiment, the heads of the fasteners and the discs associated therewith are protected with a urethane paint or primer. In other instances, a polypropylene film or tape, self-adhering or otherwise, may be used to provide the requisite corrosion protection. However, it should be emphasized that other protectants including other paints, tapes, films or other coatings exhibiting corrosion resistant properties may be applied to the heads of the fasteners and to the discs provided that such protectants do not interfere with the chemical bonding between the shank or legs of the fasteners and the cementitious material into which the fasteners are to be driven.

It is a primary object of the present invention to provide corrosion resistance to mechanical fasteners for use in cementitious roofing systems wherein the fasteners are formed of a metallic material so that the leg portions or shank portions thereof may chemically bond with the cementitious roof deck material but wherein the head portion of such fasteners are protected with a material which makes the heads corrosion resistant thereby improving the long term performance of the fasteners and associated roofing system.

It is also an object of the present invention to provide sheet metal fasteners in combination with supplemental discs or washers wherein the discs or washers are also protected by a corrosion resistant material applied thereto.

A further object of the present invention is to provide corrosion resistance to mechanical fasteners for use in cementitious roofing systems wherein the fasteners are formed of a zinc coated material so that the leg portions or shank portions thereof may chemically bond with the alkaline roof deck material but wherein the head portions of such fasteners are protected with a material which provides superior corrosion resistance to the heads thereby improving the long term performance of the fasteners and associated roofing system.

DESCRIPTION OF THE PREFERRED EMBODIMENT

Figure 1:
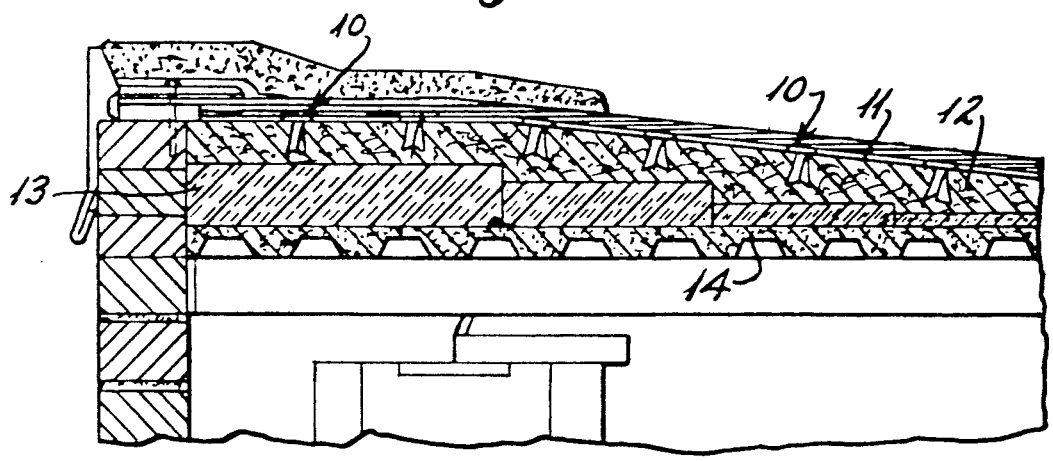
FIG. 1 is partial cross-sectional illustrational view of a conventional cementitious roofing system incorporating the fasteners with coated head of the present invention.

With continued reference to the drawings, the sheet metal fasteners with coated heads 10 of the present invention are shown in FIG. 1 in use in securing a base ply membrane 11 to a cementitious material 12 which encapsulates insulating material 13 that has been placed atop a metallic roof decking 14. As shown in the illustration, the fastener 10 includes a head portion 15 which extends along the upper surface of the base ply material 11 and a pair of spreadable legs 16 which define the shank portion of the fastener which are embedded within the cementitious material 12. The spreadable legs 16 do not extend completely through the depth of the cementitious material as it is desired that the legs confine an inverted wedge of the material therebetween when driven into the material.

Figure 2:
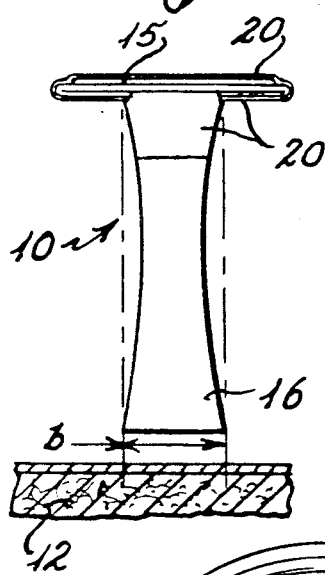
FIG. 2 is a front elevational view illustrating one form of a metal fastener having a coated head just prior to being driven through a membrane, such as shown in FIG. 1.
Figure 3:
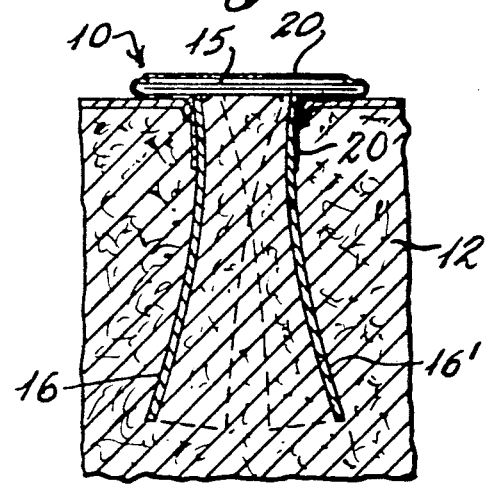
FIG. 3 is a cross-sectional view of the fastener of FIG. 2 illustrating the manner in which the legs, which define the shank, spread relative to one another as the fastener is driven into a cementitious material.

With specific reference to FIGS. 2 and 3, one embodiment of fasteners in accordance with the teachings of the present invention is disclosed in greater detail. In FIG. 2 the fasteners 10 are shown as including a head portion 15 and opposing leg portions 16 and 16'. The figure illustrates the assembly of the spreadable legs 16 and 16' just prior to the fastener being driven through a base ply membrane 11 covering a cementitious material 12. The head portion 15 of the fastener is provided with a coating 20 along the upper and lower surfaces thereof so that the total head portion of the fastener is protected with a corrosion resistant material which, in tests, has preferably been a urethane coating or polypropylene film although other polyesters may be used. In some tests self-adhering polypropylene tapes (such as FAS-SON 70466) were used to provide the protective coating for the heads of the fasteners. It should be noted that due to the various types of coating techniques which could be utilized to coat the heads of the fasteners, in some instances the coating may extend along a limited surface portion (usually not exceeding $\frac{1}{8}$ to $\frac{1}{4}$") of the legs as shown in the drawing figures. The liquid coatings may be selected from a variety of coating materials including paints or primers. One example of a satisfactory coating is Morton 645 K8.

In FIG. 3 the spreading action of the legs 16 and 16' upon being driven into the cementitious material 12 is illustrated in greater detail. The legs are integrally formed with the head portion in such a manner that they are pivotable relative to the head portion. It should be noted that as the legs spread, they effectively capture an inverted wedge of cementitious material therebetween in order to lock or retain the fasteners 10 in place.

Figure 4:
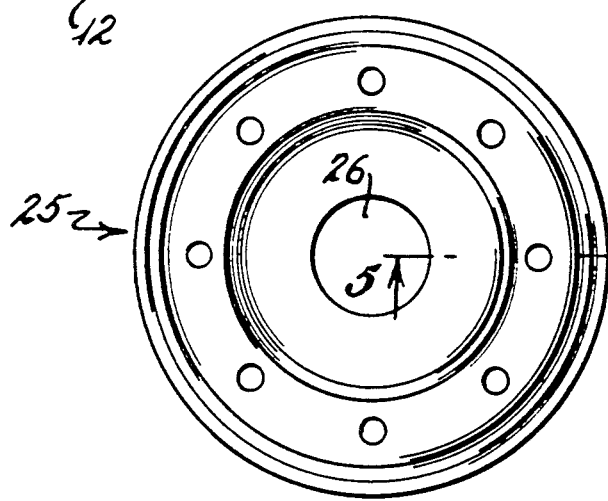
FIG. 4 is a top plan view of a washer or disc protected from corrosion in accordance with the teachings of the present invention.
Figure 5:
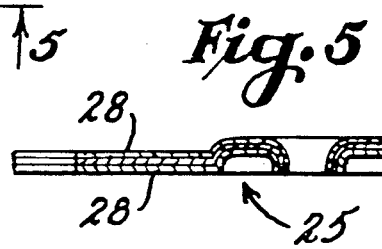
FIG. 5 is a partial cross-sectional along line 5—5 of FIG. 4.
Figure 6:
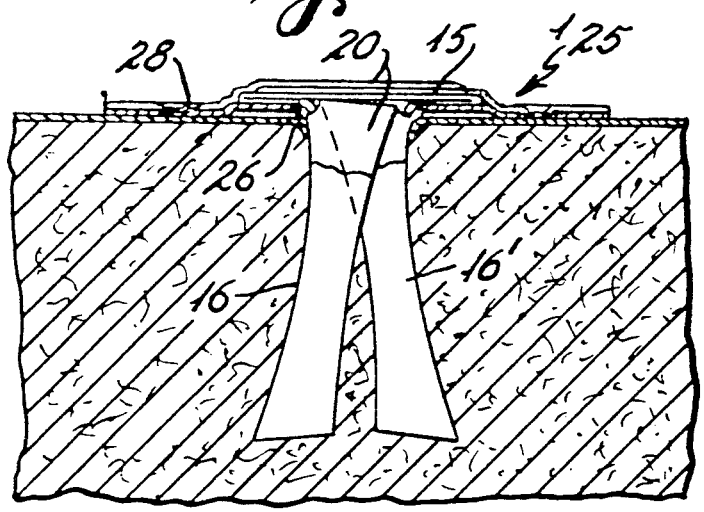
FIG. 6 is a cross-sectional view of the fastener of FIG. 3 used in conjunction with the washer or disc of FIG. 4.
Figure 7:
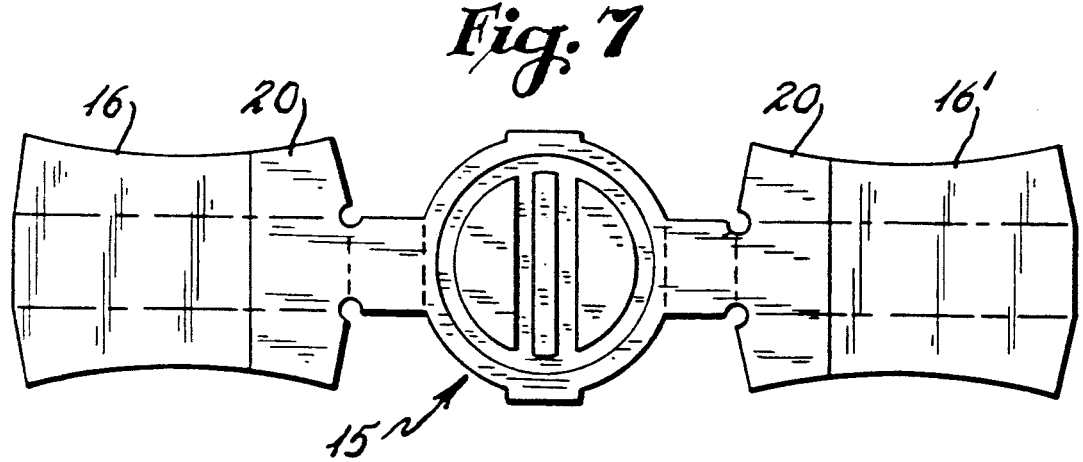
FIG. 7 is a top plan view of a coated blank from which a sheet metal fastener protected in accordance with the teachings of the present invention is made.

It has been recognized that in some instances, especially under high wind conditions, discs or washers 25, such as shown in FIG. 4, may be used in conjunction with the fasteners 10 to more securely affix the base ply membrane to the cementitious material. Such washers include a centralized opening 26 through which the legs 16 and 16' of the fastener 10 are inserted. The diameter of the discs is greater than the diameter of the head 15 of the fasteners and thereby provides an increased surface bearing area which retains the base ply membrane 11 in more secure contact with the underlying cementitious material 12. In accordance with the teachings of the present invention, whenever such discs are utilized in construction of a roof deck system such discs must also be protected or coated with a corrosion resistant material layer 28 such as set forth above with respect to the fasteners 10 on both sides of the discs. The discs are exposed to the same corrosion conditions above the base ply membrane as are the heads of the fasteners 10 and therefore require a like amount of corrosion protection.

Although the fasteners 10 of the present invention have been described as being formed with a specific configuration it should be noted that other configurations may be utilized and yet remain within the inventive concepts of the present invention. For instance, reference is made to U.S. Pat. No. 3,466,967 to Hallock wherein different styles or types of fasteners are disclosed which also may be utilized in cementitious roofing systems. Each of the fasteners disclosed therein could be protected or coated to ensure that the heads thereof are protected with a corrosion resistant material leaving the legs or shanks of the fasteners free of such protection or coatings so that the sheet metal material from which the fasteners are formed is allowed to chemically bond with the cementitious material as discussed hereinbefore. The important concept of the present invention is to recognize that those portions of the fasteners which are to be exposed above any membrane through which the fasteners are driven must be protected by a corrosion resistant layer which may vary depending upon the types of protectants available in the industry. The leg or shank portions of the fasteners, however, must remain uncoated along a substantial portion of their length so that the uncovered sheet metal material is free to chemically bond with the cementitious material when the fasteners have been installed in a cementitious roof deck system.

We claim:

1. In sheet metal fasteners including galvanized sheet metal fasteners for attaching to a cementitious material wherein the fastener includes a metallic shank portion and a head portion, the improvement comprising, a non-metallic coating material layer covering said head portion, said coating material layer formed of a corrosion resistant material and at least a substantial portion of the shank portion being free of said non-metallic coating material layer whereby said metallic shank portion may chemically bond with the cementitious material when the 2. The fastener of claim 1 in which the head portion includes upper and lower surfaces, said coating material layer covering said upper and lower surfaces of said head portion.

3. The fastener of claim 2 including a washer means having an opening therethrough through which the shank portion of the fastener extends, said washer means having a diameter greater than the head portion of the fastener, said washer means having upper and lower surfaces, and a corrosion resistant coating material layer covering said upper and lower surfaces of said washer means.

4. The fastener of claim 3 in which said coating material layer is selected from a group of materials consisting of urethanes and polypropylenes.

5. The fastener of claim 2 in which said coating material layer is selected from a group of materials consisting of urethanes and polypropylenes.

6. The Sheet metal fastener of claim 1 wherein said coating material layer is a tape or film.

7. In a galvanized sheet metal fastener for attaching to a cementitious material wherein the fastener includes a shank portion and a head portion having upper and lower surfaces the improvement comprising, a supplemental non-metallic coating material layer covering said upper and lower surfaces of said head portion, said supplemental coating material layer formed of a corrosion resistant material, and at least a substantial portion of the shank portion being free of said supplemental coating material layer whereby said shank portion may chemically bond with the cementitious material when the fastener is applied thereto.

8. The galvanized fastener of claim 7 including a washer means having an opening therethrough through which the shank portion of the fastener extends, said washer means having a diameter greater than the head portion of the fastener, said washer means having upper and lower surfaces, and a corrosion resistant coating material layer covering said upper and lower surfaces of said washer means.

9. The galvanized fastener of claim 8 in which said supplemental coating material layers are selected from a group of materials consisting of urethanes and polypropylenes.

* * * * *

UNITED STATES PATENT AND TRADEMARK OFFICE
CERTIFICATE OF CORRECTION

PATENT NO. : 5,125,779
DATED : June 30, 1992
INVENTOR(S) : Peter Hallock, et. al.

It is certified that error appears in the above-indentified patent and that said Letters Patent is hereby corrected as shown below:

Column 5, line 34, after "the" insert --fastener is applied thereto--.

Signed and Sealed this

Seventh Day of September, 1993

Attest:

BRUCE LEHMAN

Attesting Officer

Commissioner of Patents and Trademarks